(12) United States Patent
McMakin

(10) Patent No.: US 10,196,951 B2
(45) Date of Patent: Feb. 5, 2019

(54) SELECTIVE CATALYTIC REACTOR (SCR) DOOR SYSTEMS

(71) Applicant: Boiler Tube Company of America, Lyman, SC (US)

(72) Inventor: Russell L. McMakin, Prosperity, SC (US)

(73) Assignee: Boiler Tube Company of America, Lyman, SC (US)

( * ) Notice: Subject to any disclaimer, the term of this patent is extended or adjusted under 35 U.S.C. 154(b) by 0 days.

(21) Appl. No.: 15/169,406

(22) Filed: May 31, 2016

(65) Prior Publication Data
US 2017/0342887 A1 Nov. 30, 2017

(51) Int. Cl.
*F01N 3/20* (2006.01)
(52) U.S. Cl.
CPC ........ *F01N 3/2066* (2013.01); *F01N 2450/00* (2013.01); *F01N 2450/30* (2013.01); *F01N 2490/00* (2013.01); *F01N 2590/10* (2013.01)
(58) Field of Classification Search
USPC ........................................................ 414/172
See application file for complete search history.

(56) References Cited

U.S. PATENT DOCUMENTS

| | | | | |
|---|---|---|---|---|
| 956,078 A | * | 4/1910 | Greenfield | B65G 11/146 193/5 |
| 1,759,207 A | * | 5/1930 | Rose | E05F 13/04 49/132 |
| 2,348,574 A | * | 5/1944 | Ross | A61L 2/06 312/291 |
| 2,575,815 A | * | 11/1951 | Jefferson | B61L 1/20 200/17 R |
| 2,767,016 A | * | 10/1956 | Wood | B60P 1/438 105/458 |
| 2,857,922 A | * | 10/1958 | Effinger | C23G 3/04 104/48 |
| 3,058,320 A | * | 10/1962 | Foster | F25D 25/00 186/54 |
| 3,090,516 A | * | 5/1963 | Seymour | E04G 21/16 280/47.11 |
| 3,237,882 A | * | 3/1966 | Grosswiller, Jr. | B65G 51/26 406/110 |

(Continued)

FOREIGN PATENT DOCUMENTS

| CN | 204373402 U | 6/2015 |
|---|---|---|
| WO | WO-0110539 A1 | 2/2001 |

OTHER PUBLICATIONS

U.S. Appl. No. 11/173,107, McMakin.
U.S. Appl. No. 12/215,427, McMakin.

*Primary Examiner* — Catherine A Kelly
(74) *Attorney, Agent, or Firm* — Locke Lord LLP; Joshua L. Jones; Alicia J. Carroll

(57) ABSTRACT

A door system for a doorway to a gas-tight chamber includes a door panel that selectively moves between a closed position for sealing a doorway of a chamber and an open position for permitting access to an interior of the chamber through the doorway. The door panel has an inner side generally facing the interior of the chamber when the door panel is in the closed position. A door panel track is connected to the inner side of the door panel. The door panel track selectively cooperates with an interior track of the chamber to facilitate movement of a cart between the door panel to the interior of the chamber.

19 Claims, 13 Drawing Sheets

(56) References Cited

U.S. PATENT DOCUMENTS

| | | | | |
|---|---|---|---|---|
| 3,266,175 | A * | 8/1966 | Palumbi | G09B 23/08 |
| | | | | 177/232 |
| 3,298,546 | A * | 1/1967 | Jones | F27D 1/1858 |
| | | | | 110/177 |
| 3,613,914 | A * | 10/1971 | Jaekle | B61D 19/00 |
| | | | | 410/6 |
| 3,630,439 | A * | 12/1971 | Cook | E01B 5/14 |
| | | | | 104/103 |
| 3,844,424 | A * | 10/1974 | Ross, Jr. | B61D 19/00 |
| | | | | 292/36 |
| 4,003,714 | A * | 1/1977 | Foglino | B01J 3/03 |
| | | | | 104/94 |
| 4,154,416 | A * | 5/1979 | Bruce | B64C 1/1407 |
| | | | | 114/66 |
| 4,332,626 | A * | 6/1982 | Hood | B08B 9/08 |
| | | | | 110/236 |
| 4,478,001 | A * | 10/1984 | Hogan | B60J 5/0497 |
| | | | | 135/93 |
| 4,677,918 | A * | 7/1987 | Baker | B61D 3/187 |
| | | | | 105/378 |
| 4,690,626 | A * | 9/1987 | Krzepinski | B29C 33/36 |
| | | | | 414/152 |
| 4,800,824 | A | 1/1989 | DiFonzo | |
| 4,828,424 | A * | 5/1989 | Crisp, Sr. | E01F 13/08 |
| | | | | 404/6 |
| 4,938,690 | A * | 7/1990 | Thomlinson | F27B 9/10 |
| | | | | 110/173 R |
| 5,009,856 | A * | 4/1991 | Fenger | B01D 53/8609 |
| | | | | 414/173 |
| 5,158,043 | A | 10/1992 | Emsbo | |
| 5,417,935 | A | 5/1995 | Jaynes et al. | |
| 5,441,376 | A * | 8/1995 | Napierkowski | B01J 3/002 |
| | | | | 14/71.1 |
| 5,466,111 | A * | 11/1995 | Meyer | A61G 5/1059 |
| | | | | 280/250.1 |
| 5,972,467 | A * | 10/1999 | Washo | B27J 1/00 |
| | | | | 144/333 |
| 6,132,157 | A * | 10/2000 | Comardo | B01J 8/002 |
| | | | | 141/232 |
| 6,253,976 | B1 * | 7/2001 | Coleman | B60R 9/00 |
| | | | | 224/281 |
| 6,412,221 | B1 * | 7/2002 | Emsbo | B01J 3/03 |
| | | | | 292/256.75 |
| 6,423,151 | B1 * | 7/2002 | Gonzalez | B01J 3/04 |
| | | | | 134/10 |
| 6,435,229 | B1 * | 8/2002 | Noah | B01J 4/00 |
| | | | | 141/2 |
| 6,521,104 | B1 * | 2/2003 | Kidd | C23C 14/26 |
| | | | | 118/719 |
| 6,781,083 | B1 | 8/2004 | Keller et al. | |
| 6,858,813 | B1 | 2/2005 | Keller et al. | |
| 6,863,000 | B2 * | 3/2005 | Neugebauer | B61D 23/02 |
| | | | | 105/332 |
| 7,032,829 | B2 * | 4/2006 | Schwarzbich | E01B 9/66 |
| | | | | 238/281 |
| 7,189,437 | B2 * | 3/2007 | Kidd | C23C 14/32 |
| | | | | 414/253 |
| 7,389,610 | B1 | 6/2008 | McMakin et al. | |
| 7,770,720 | B2 * | 8/2010 | Freudelsperger | B65G 21/00 |
| | | | | 198/583 |
| 8,128,888 | B2 * | 3/2012 | Bacik | A61L 2/208 |
| | | | | 422/29 |
| 8,163,236 | B1 * | 4/2012 | Bacik | A61L 2/208 |
| | | | | 422/28 |
| 8,777,542 | B2 * | 7/2014 | Daneshvar | A61G 3/0209 |
| | | | | 224/527 |
| 9,296,554 | B2 * | 3/2016 | Ferren | B65D 88/121 |
| 9,688,206 | B1 * | 6/2017 | Daneshvar | B60R 5/04 |
| 2003/0136595 | A1 * | 7/2003 | Lacy | B60P 3/42 |
| | | | | 180/89.1 |
| 2008/0006510 | A1 * | 1/2008 | Freudelsperger | B65G 1/00 |
| | | | | 198/593 |
| 2011/0162815 | A1 * | 7/2011 | Kang | B22D 27/15 |
| | | | | 164/253 |
| 2012/0121462 | A1 * | 5/2012 | Bacik | A61L 2/208 |
| | | | | 422/37 |
| 2013/0172526 | A1 * | 7/2013 | Carvajal | F27D 3/00 |
| | | | | 530/202 |
| 2017/0197725 | A1 * | 7/2017 | Foo | B64C 39/024 |
| 2017/0327164 | A1 * | 11/2017 | Kapuria | B62D 57/024 |

* cited by examiner

SELECTIVE CATALYTIC REACTOR (SCR) DOOR SYSTEMS

BACKGROUND OF THE INVENTION

1. Field of the Invention

The present disclosure relates to gas tight door systems, and, more particularly, to door systems for selective catalytic reactor systems.

2. Description of Related Art

Gas-tight doors are used in high temperature industrial applications, such as in boilers, economizers, scrubbers, precipitators, bag houses, flue gas ducts, etc., and in particular, in door systems for selective catalytic reactor (SCR) systems. SCR systems use catalyst material held in containers to reduce nitrogen oxides from flue gas, such catalyst material and/or containers being periodically transported into and out of the SCR structure on carts to replenish the catalyst as necessary through an opening or doorway in the SCR structure's casing. Typically, a landing or platform outside of the SCR casing extends outwardly from the opening for supporting such carts prior to their entry through the opening into the interior compartment of the SCR casing. The carts are generally moved about within the SCR on tracks or rails in the SCR. When providing the carts to the SCR, they are oftentimes staged on the platform outside of the SCR casing and preferably travel on such tracks or rails through the opening in the SCR.

While operable doors may be provided in the SCR casing to allow access to the interior of the SCR structure, in some cases, a makeshift "door" is created by cutting the SCR's casing to provide an opening, and then, after the catalyst replenishment and/or other maintenance has been provided in the SCR, welding the "door" which was cut out from the SCR casing back into place. This can result in a time-consuming and labor intensive procedure, and, since the SCR is generally not operational during such maintenance procedure, the length of the downtime of the SCR may be increased. In certain applications, if the SCR system is down, then a power plant required to use the SCR system likewise experiences an outage until the SCR maintenance can be completed.

Traditional gas-tight doors in SCR systems have been considered suitable for their intended purpose, however there is still need for improved door systems. This disclosure provides a solution for this need.

SUMMARY OF THE INVENTION

A door system for a doorway to a gas-tight chamber includes a door panel that selectively moves between a closed position for sealing a doorway of a chamber and an open position for permitting access to an interior of the chamber through the doorway. The door panel has an inner side generally facing the interior of the chamber when the door panel is in the closed position. A door panel track is connected to the inner side of the door panel. The door panel track selectively cooperates with an interior track of the chamber to facilitate movement of a cart between the door panel to the interior of the chamber.

In accordance with some embodiments, the door panel includes a hinge side and a top side opposite from the hinge side. The door panel can pivot about a hinge axis on the hinge side between the open position and the closed position. It is contemplated that in some embodiments the door system can include a hinge assembly on the hinge side of the door panel. The hinge assembly can include a hinge lug and a pin. The hinge lug can be operatively connected to the door panel and includes an aperture for receiving the pin. The aperture can be sized to provide a predetermined amount of play between the pin and the aperture such that the door panel is free to move for adjusting to generally uniformly contact and compress a gasket upon the door panel being moved to the closed position.

The door panel can include spaced apart slots around its periphery to accommodate swing bolts securing the door panel in the closed position. The door panel track can be a first door panel track and the door system can include a second door panel track connected to the inner side of the door panel. The door panel track can include height adjustment slots to adjust the height of the door panel track with respect to the interior side of the door panel when the door panel is in the open position. The door panel track can include lateral adjustment slots to adjust the position of the door panel track in a direction parallel to a hinge axis of the door panel.

In accordance with some embodiments, the door system includes a door frame for surrounding a doorway. The door frame can be selectively engaged with the door panel when the door panel is in the closed position. The door frame can include swing bolts around its periphery to selectively engage with the door panel when the door panel is in the closed position. The door frame can include rectangular tubing. The swing bolts can be mounted to the rectangular tubing.

The door panel can be a first door panel and the door system can include a second door panel adjacent to the first door panel. The first and second door panels can form a gap therebetween. The door system can include a splice plate releasably attached to the first and second door panels to selectively cover the gap in a sealed position. The splice plate defines a longitudinal axis and can include spaced apart slots having respective openings that face away from the longitudinal axis to accommodate swing bolts in the sealed position.

In accordance with some embodiments, the door system can include a bridge piece selectively engageable with the door panel track when the door panel is in the open position to connect the door panel track with an interior track of the chamber to facilitate movement of a cart across a threshold between the door panel to the interior of the chamber. In accordance with some embodiments, the door system can include an extension piece selectively engageable with the door panel track when the door panel is in the open position to extend the door panel track beyond the periphery of the door panel on a top side of the door panel opposite from a hinge axis of the door panel to facilitate movement of a cart beyond the periphery of the door panel.

The door system can include an opening/closing rod assembly operatively connected to a top side of the door panel opposite from a hinge axis of the door panel. The opening/closing rod assembly can include a removable threaded rod and a keeper lug to hold the removable threaded rod. The keeper lug can include a rotatable block through which the removable threaded rod extends. The door system can include a removable safety chain to selectively engage with a side of the door panel opposite from a hinge axis of the door panel.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
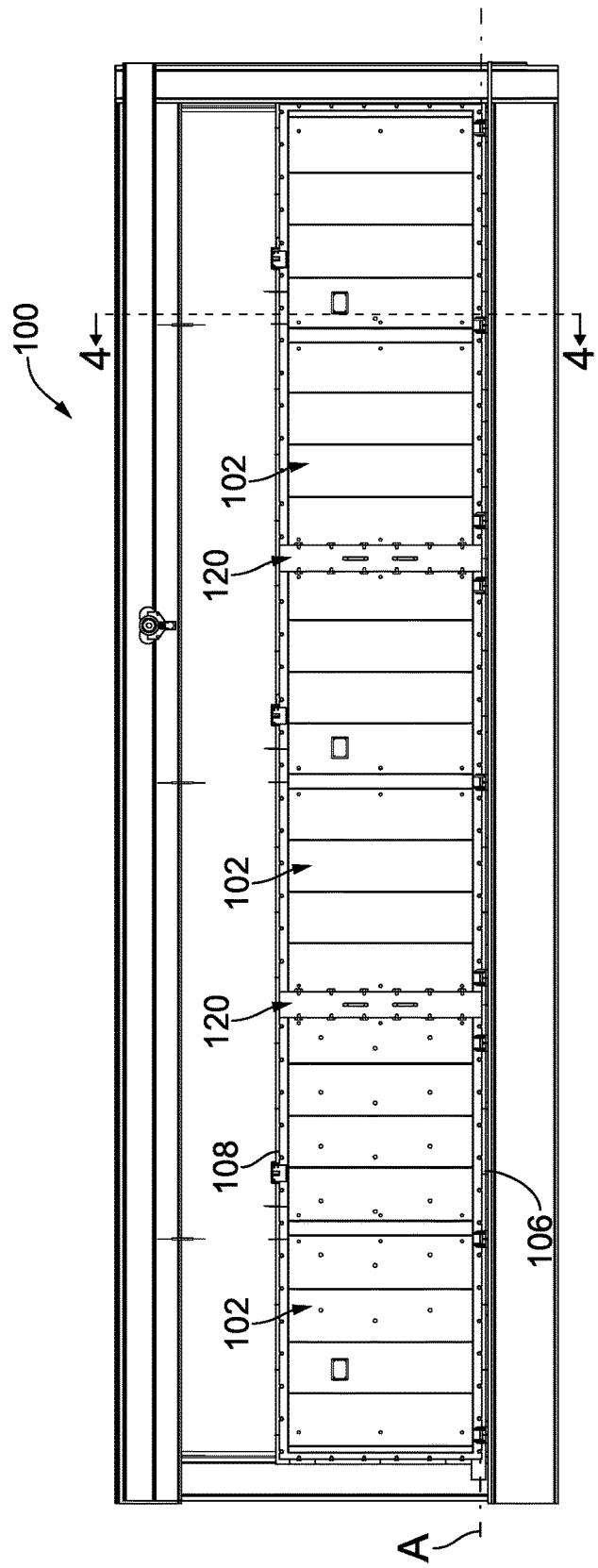
FIG. 1 is a front elevation view of an embodiment of a selective catalytic reactor (SCR) door system constructed in accordance with the present invention, showing three door panels in a closed position from outside of the SCR chamber.

Reference will now be made to the drawings wherein like reference numerals identify similar structural features or aspects of the subject disclosure. For purposes of explanation and illustration, and not limitation, a partial view of an exemplary embodiment of an SCR door system 100 in accordance with the disclosure is shown in FIG. 1 and is designated generally by reference character 100. Other embodiments of systems in accordance with the disclosure, or aspects thereof, are provided in FIGS. 2-11, as will be described. FIGS. 1-11 and the foregoing detailed description, when taken together, are considered the written description of the embodiments of the present invention.

As shown in FIG. 1, a door system 100, e.g. an SCR door system, for a doorway to a gas-tight chamber in an SCR system, includes a plurality of door panels 102 that selectively move between a closed position for sealing a doorway of a chamber and an open position for permitting access to an interior of the chamber through the doorway. Each door panel 102 includes a hinge side 106 and a top side 108 opposite from hinge side 106. Each door panel 102 pivots about a hinge axis A on hinge side 106 between the open position and the closed position.

Figure 2:
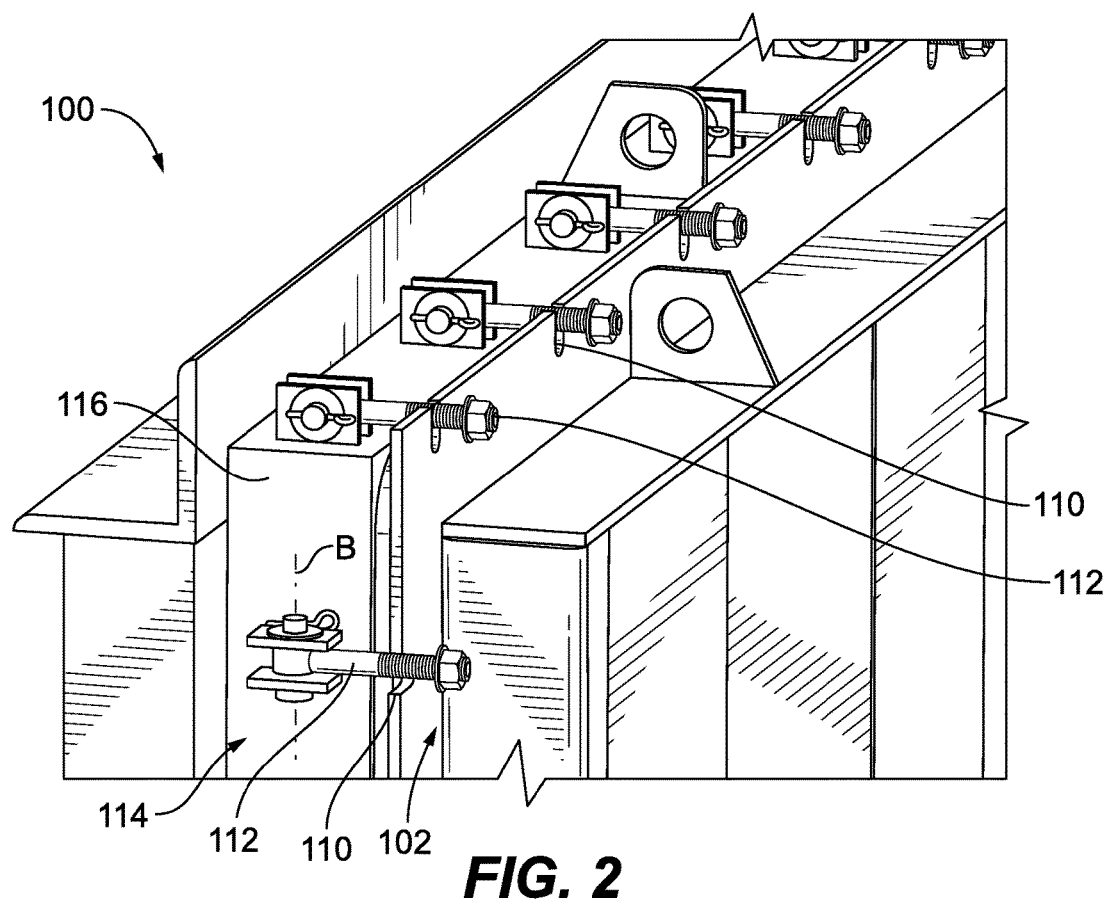
FIG. 2 is a perspective view of a portion of the SCR door system of FIG. 1, showing the top of one of the door panels engaged with swing bolts of the door frame when the door panel is in a closed position from outside of the SCR chamber.

With reference now to FIG. 2, each door panel 102 includes spaced apart slots 110 around its periphery to accommodate swing bolts 112 for securing door panel 102 in the closed position. Door system 100 includes a door frame 114 for surrounding a doorway. Door frame 114 is engaged with each door panel 102 when door panels 102 are in the closed position. Swing bolts 112 are mounted about the periphery of door frame 114 to selectively engage with respective spaced apart slots 110 of each door panel 102 when each door panel 102 is in the closed position. Door frame 114 includes rectangular tubing 116, shown in more detail in FIG. 5. Swing bolts 112 are mounted to rectangular tubing 116. Rectangular tubing 116 provides additional support to hold door panels 102 in the closed position. Each swing bolt 112 is configured to selectively rotate about its swing bolt axis B to engage or disengage with respective slots 110 of door panel 102.

Figure 3A:
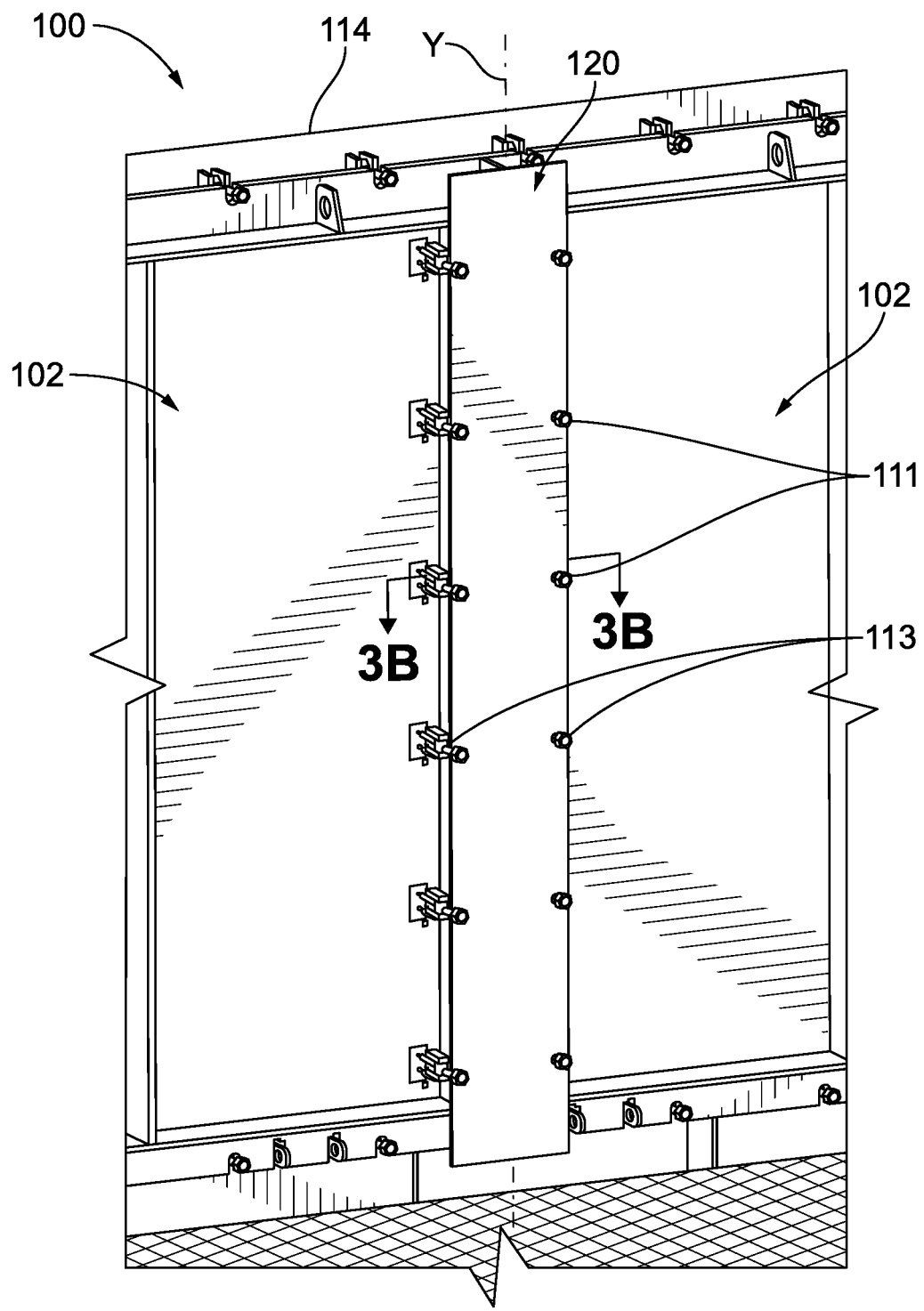
FIG. 3A is a front perspective view of a portion of the SCR door system of FIG. 1, showing the splice plate covering the gap in between two door panels when the door panels are in a closed position.
Figure 3B:
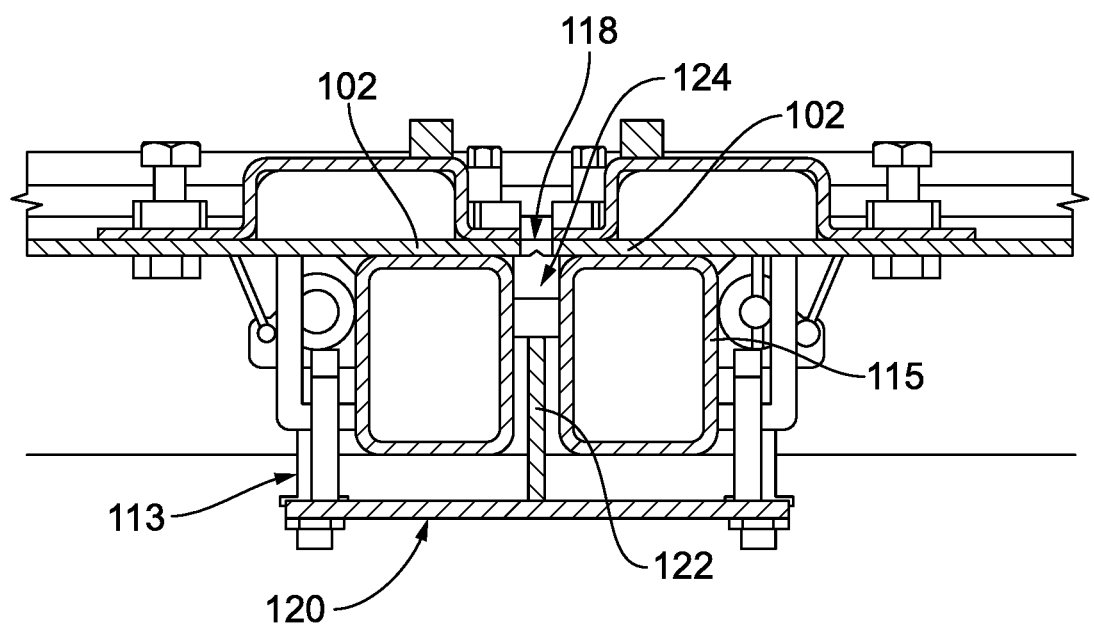
FIG. 3B is a top cross-sectional view of a portion of the SCR door system of FIG. 1, showing the splice plate having a flange that extends inward toward door frame forming a t-shaped cross-section.

As shown in FIGS. 3A and 3B, two adjacent door panels 102 form a gap 118 therebetween. Door system 100 includes a splice plate 120 releasably attached between each set of adjacent door panels 102. For example, for the embodiment shown in FIG. 1, there are two splice plates 120 and two sets of adjacent door panels 102. Splice plate 120 is held in place in a sealed position with swing bolts 113. Swing bolts 113 are similar to swing bolts 112, except that they are mounted to rectangular tubing 115 on each door panel 102. Splice plate 120 acts to cover gap 118 when it is in a sealed position, e.g. when door panels 102 are in a closed position. Splice plate 120 defines a longitudinal axis Y and includes spaced apart slots 111 having respective openings that face away from longitudinal axis Y to accommodate swing bolts 113 in the sealed position. Splice plate 120 includes a flange 122 that extends inward toward door frame 114 forming a t-shaped cross-section. Flange 122, when in the sealed position, compresses a gasket 124 between door panels 102. Gasket 124 is pushed in place after two adjacent door panels 102 are in the closed position. Gasket 124 is held in place with friction until splice plate 120 is in engaged.

Figure 4:
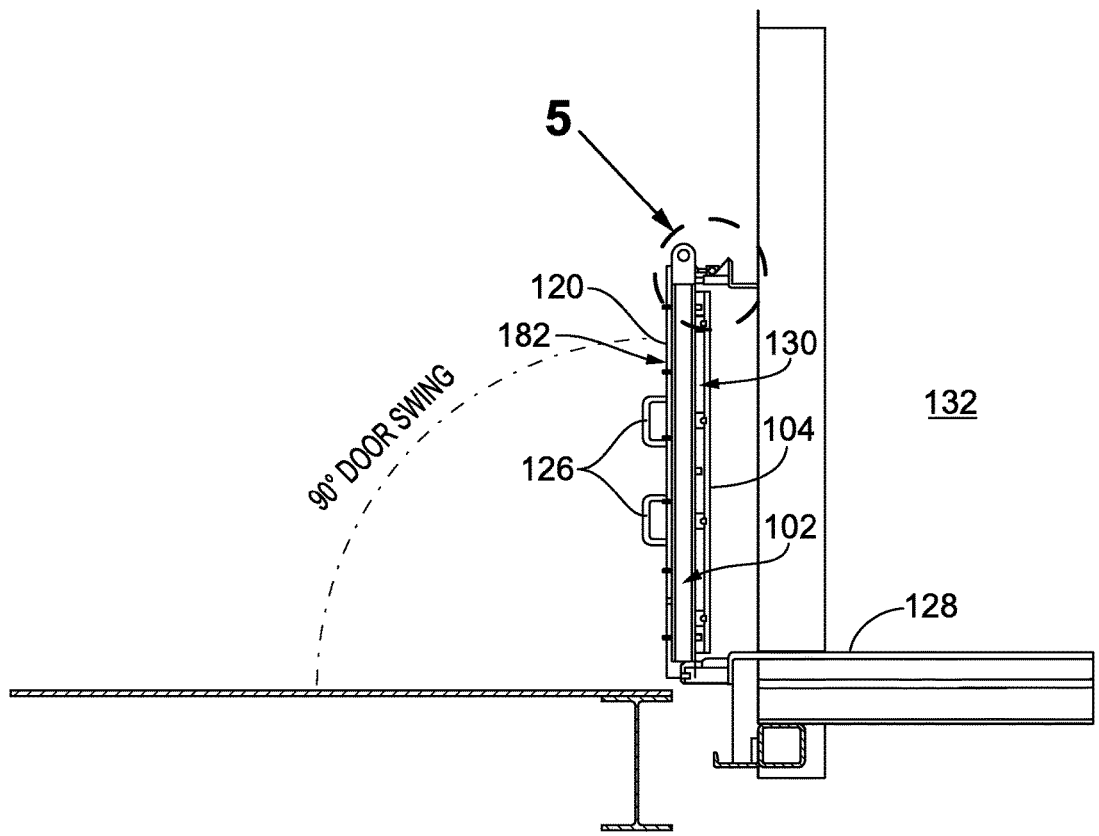
FIG. 4 is a cross-sectional side elevation view of the SCR door system of FIG. 1, showing the door panels in a closed position sealing the inside of the SCR chamber from the outside.

With reference now to FIG. 4, each splice plate 120 also includes handles 126 to assist in the removal and replacement of splice plate 120 during use. Each door panel 102 has an inner side 130 generally facing the interior of chamber 132 when door panel 102 is in the closed position and an outer side 182 generally facing a landing or platform outside of the SCR. A door panel track 104 is connected to the inner side 130 of door panel 102. Door panel track 104 selectively cooperates with an interior track 128 of chamber 132 to facilitate movement of a cart 168, described below, between door panel 102 and interior of chamber 132 when door panel 102 is in the open position.

Figure 6:
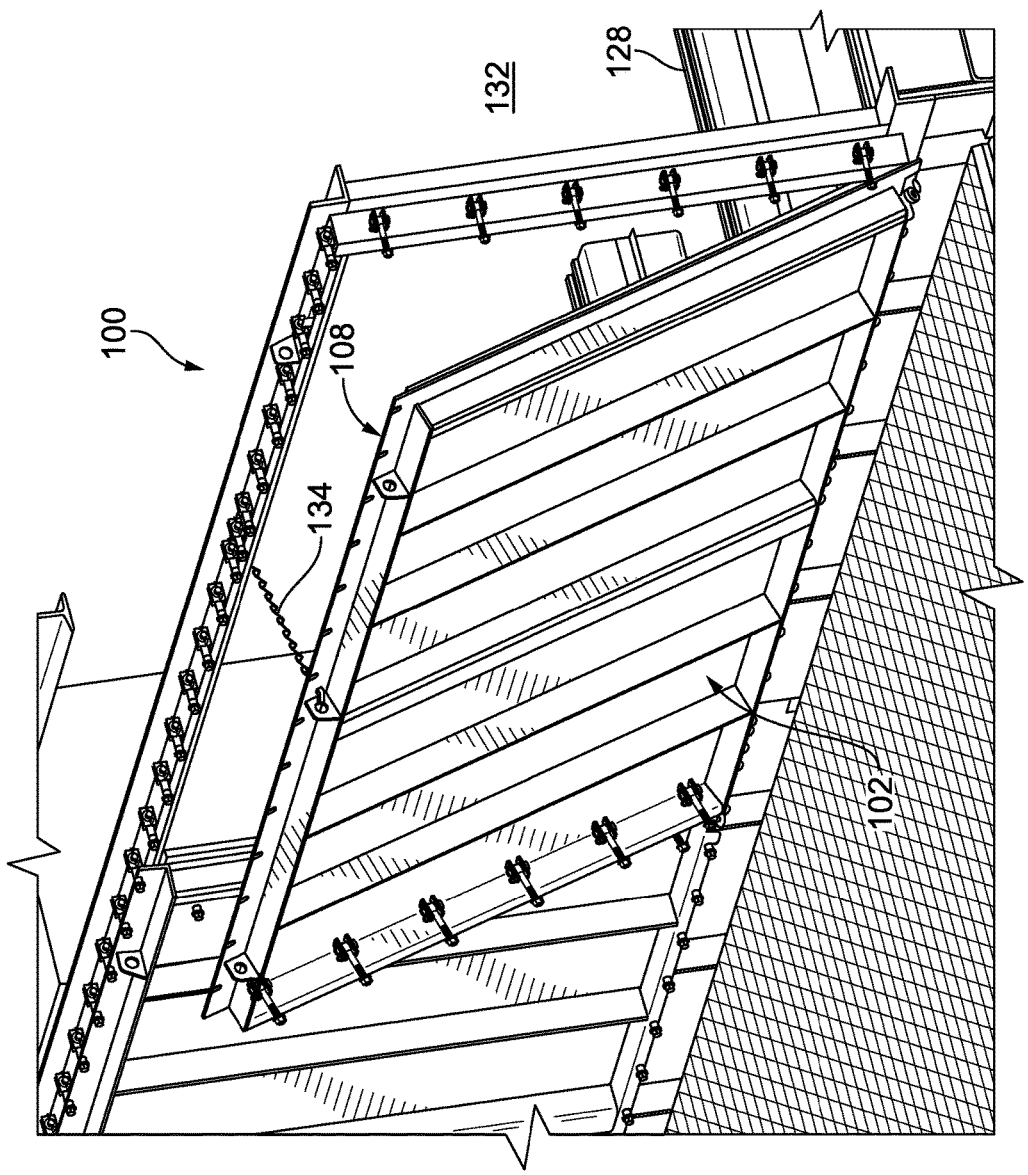
FIG. 6 is a perspective view of a portion of the SCR door system of FIG. 1, showing one of the door panels in a partially opened position suspended from the door frame with the removable safety chain.
Figure 7A:
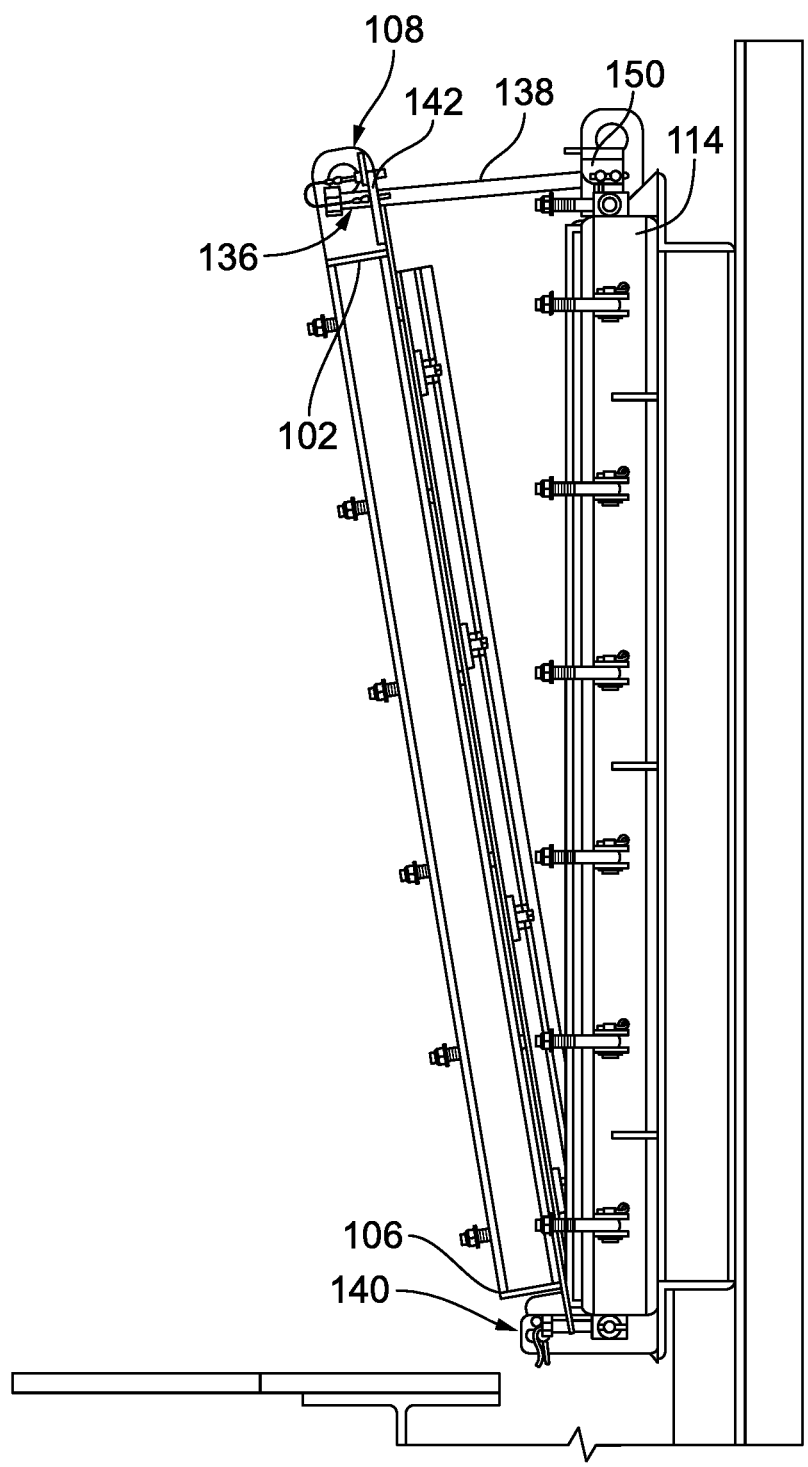
FIG. 7A is a side view of the SCR door system of FIG. 1, showing one of the door panels in a partially opened position suspended from the door frame with the opening/closing rod assembly.
Figure 7B:
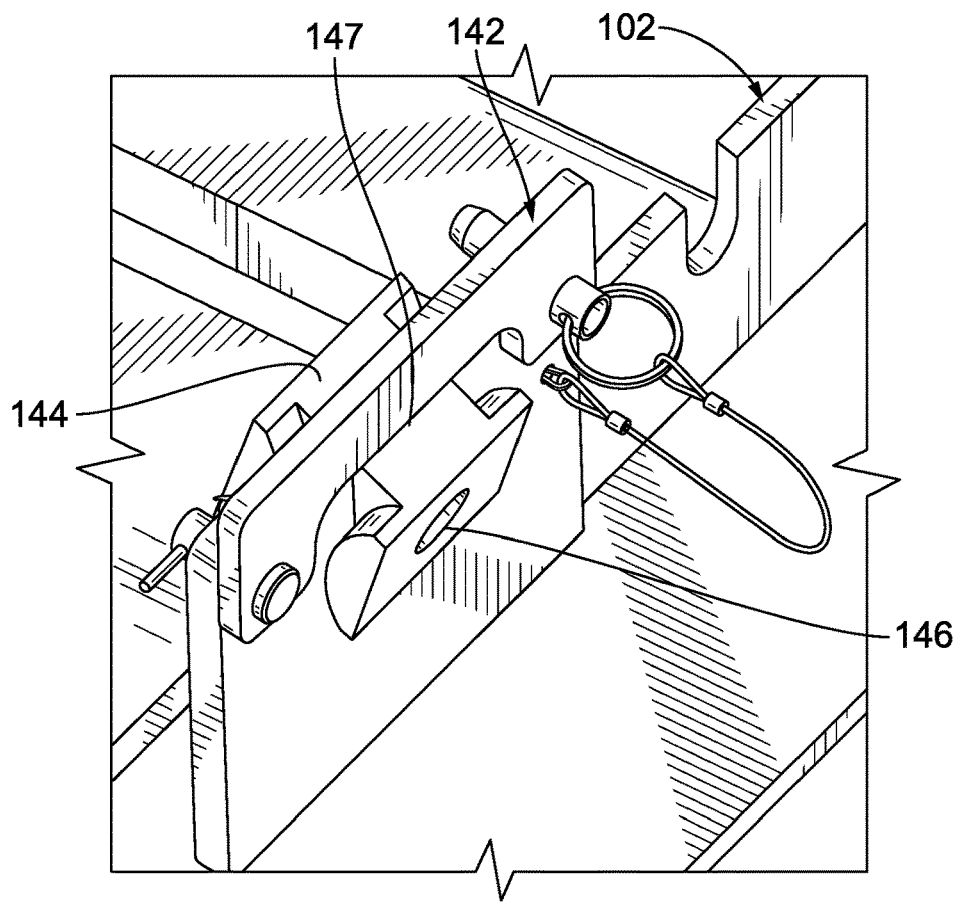
FIG. 7B is a top view of the door panel of the SCR door system of FIG. 1, showing the keeper lug with a rotatable block having a hole 146 through which removable threaded rod extends.

As shown in FIGS. 6, 7A and 7B, each door panel 102 of door system 100 includes a removable safety chain 134 to selectively engage with top side 108 of each respective door panel 102. Safety chain 134 is used to protect personnel from door panel 102 opening the entire way until it can be connected to an external structure to complete the lowering process. Once door panel 102 is connected to an external structure safety chain 134 is disconnected. Each door panel 102 of door system 100 includes an opening/closing rod assembly 136 operatively connected to top side 108 of each door panel 102. Each opening/closing rod assembly 136 includes a removable threaded rod 138 and keeper lugs 142 and 150 (one on door panel 102 and one on the door frame 114, respectively), to hold the removable threaded rod. Keeper lug 142 includes a rotatable block 144 having a hole 146 through which removable threaded rod 138 extends. Threaded rod 138 is not shown in FIG. 7B for clarity.

With continued reference to FIGS. 6, 7A and 7B, rotatable block 144 rotates in a slot 147 of keeper lug 142 to allow the angle of threaded rod 138 to adjust as needed as door panel 102 is being lowered into the open position. This allows for each opening/closing rod assembly 136 to support door panel 102 as it is lowered for the first 2-3 feet and as it is raised for the last 2-3 feet. Opening/closing rod assembly 136 is a mechanical method to lower and raise the door until it can be connected to an external structure. Safety chain 134 and opening/closing rod assembly 136 may or may not be used together. After and/or before using opening/closing rod assembly 136, each door panel can be lifted and/or lowered using a variety of other mechanisms or external structures, including motorized forklifts, and/or manually. Each removable safety chain 134 and removable threaded rod 138 are disengaged to allow each door panel 102 to be fully opened.

Figure 5:
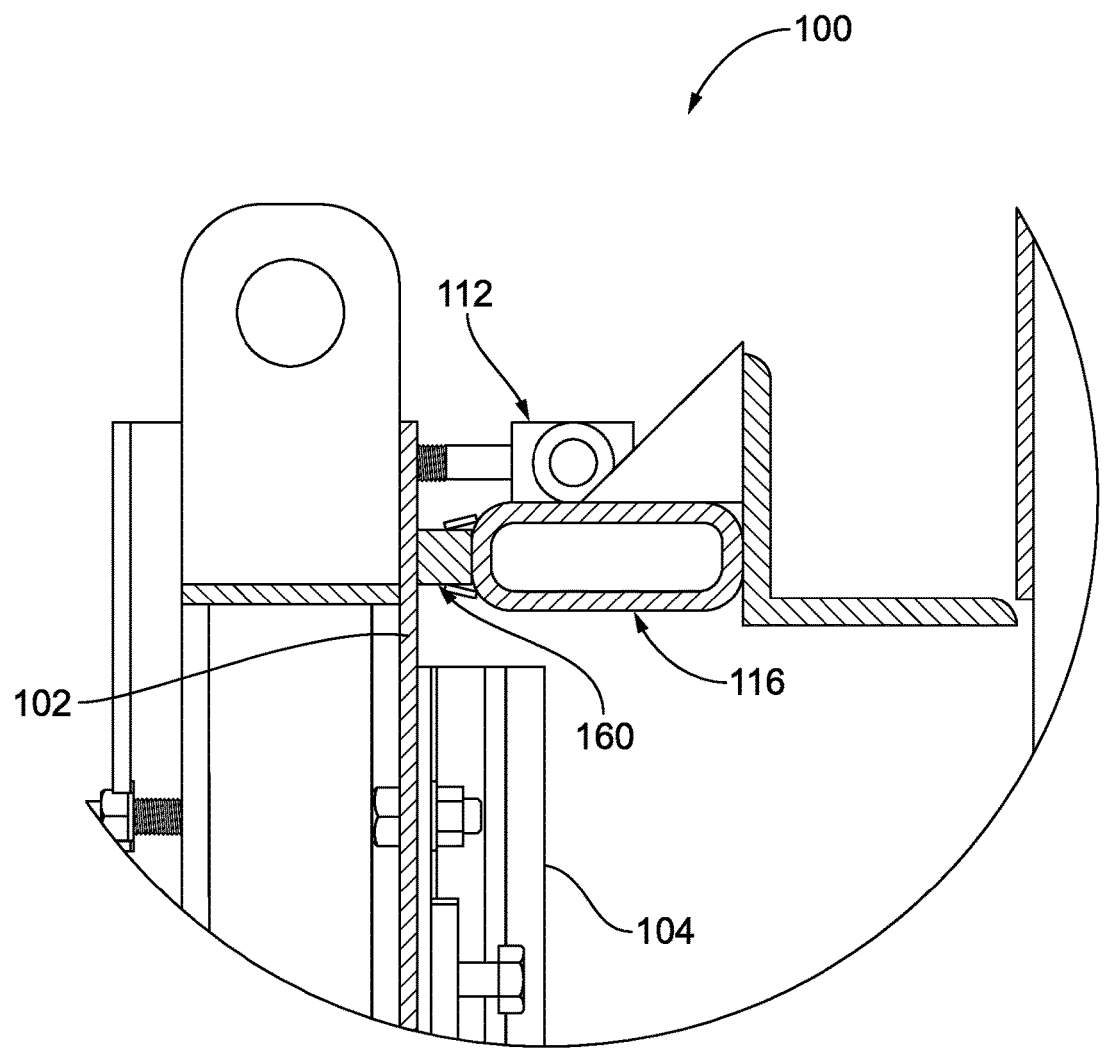
FIG. 5 is a cross-sectional side elevation view of the SCR door system of FIG. 1, showing the door panels in a closed position compressing a gasket upon the door frame.
Figure 7C:
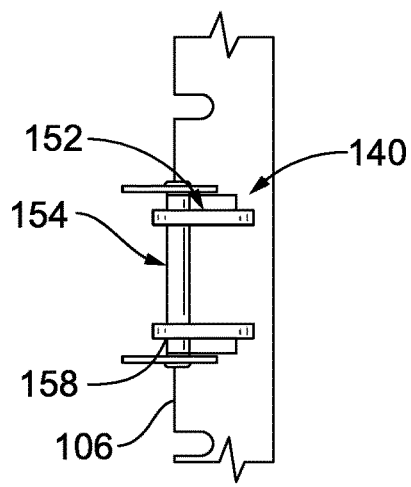
FIG. 7C is a bottom view of the SCR door system of FIG. 1, showing one of the door panels to show the portion of the hinge assembly operatively connected to the door panel, the door frame is not shown for clarity.

With reference now to FIGS. 5, 7A and 7C, door system 100 includes a hinge assembly 140 on hinge side 106 of door panel 102. Hinge assembly 140 includes a hinge lug 152 and a pin 154. Hinge lug 152 is operatively connected to door panel 102 and includes an aperture 158 for receiving pin 154. Aperture 158 is sized to provide a predetermined amount of play between pin 154 and aperture 158 such that door panel 102 is free to move for adjusting to generally uniformly contact and compress a gasket 160 upon door panel 102 being moved to the closed position, shown in FIG. 5.

Figure 8A:
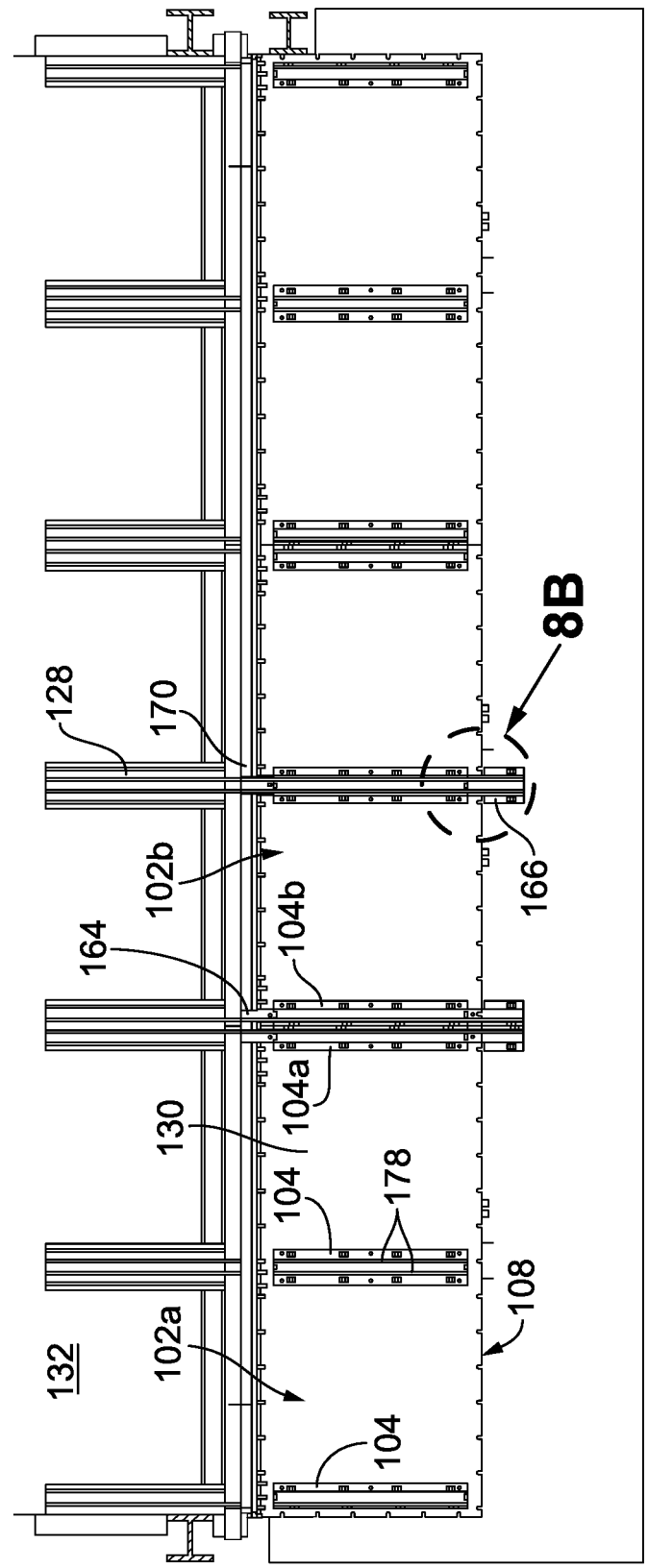
FIG. 8A is a top view of the SCR door system of FIG. 1, showing three door panels in an open position from outside of the SCR chamber with a plurality of bridge pieces connecting respective door panel tracks to respective interior tracks of the chamber to facilitate movement of a cart across the threshold between the door panel and the interior of the chamber.
Figure 8B:
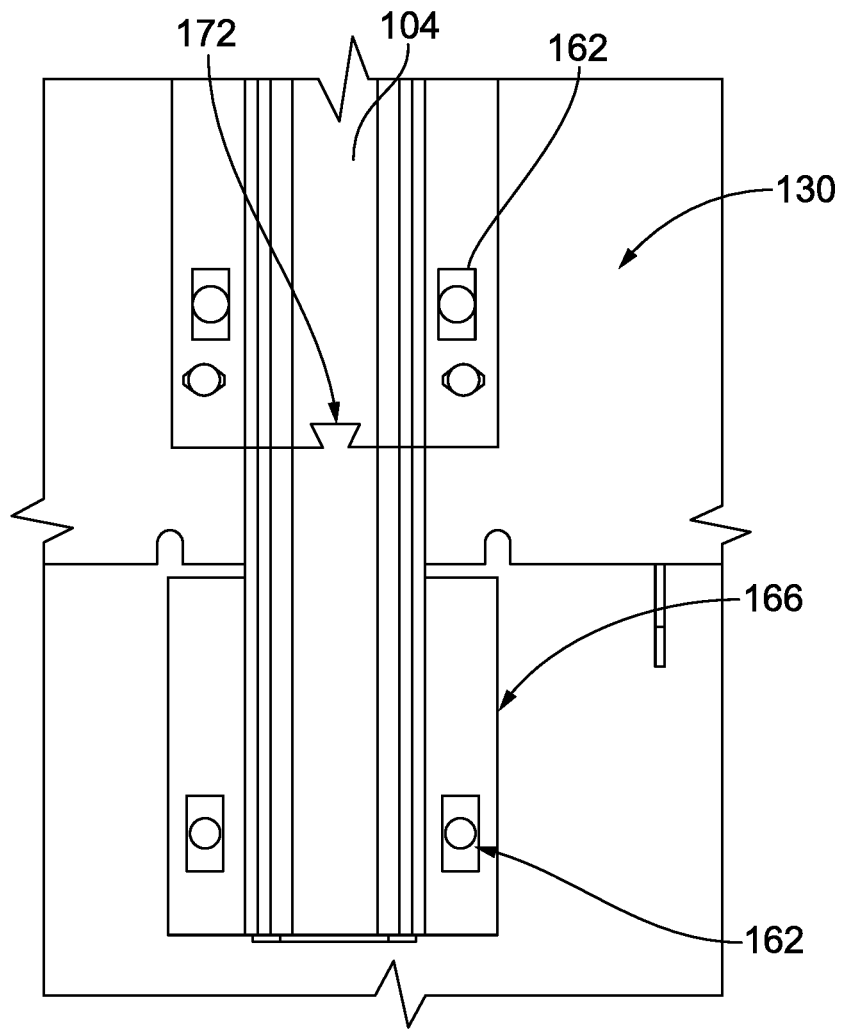
FIG. 8B is an enlarged detail view of a portion of FIG. 8A, showing an extension piece operatively connected to the door panel track.
Figure 9:
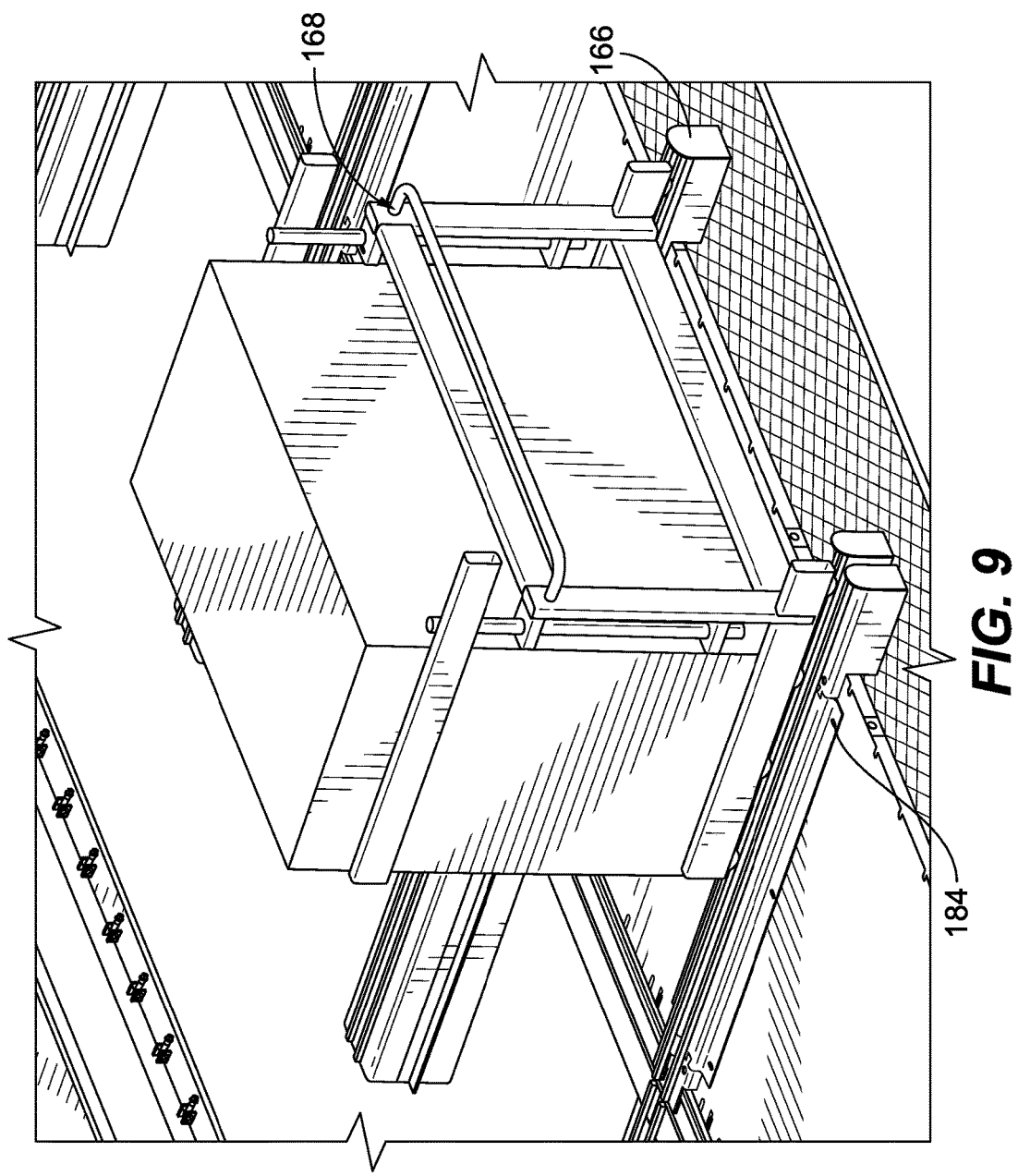
FIG. 9 is a perspective view of a portion of the SCR door system of FIG. 1, showing door panels in an open position from outside of the SCR chamber with extension pieces engaged with respective door panel tracks to extend the door panel tracks beyond the periphery of the door panel to facilitate movement of a cart beyond the periphery of the door panel.

As shown in FIGS. 8A-9, each door panel is shown in the fully opened position. Each door panel 102 includes multiple door panel tracks 104 connected to inner side 130 of door panel 102. Each track 104 stops short of the door panel perimeter in order to accommodate a sealing interface between door panel 102 and sealing gasket 160 (shown in FIG. 5). Each track 104 of door system 100 includes a respective bridge piece 164 selectively engageable with door panel track 104 when door panel 102 is in the open position to connect door panel track 104 with respective interior tracks 128 of chamber 132 to facilitate movement of a cart 168 across a threshold 161 between door panel 102 and the interior of chamber 132. After using, each bridge piece 164 is removed and can be stored on outer side 182 (shown in FIG. 4) of one or more of door panels 102 or in another suitable location.

With continued reference to FIGS. 8A-9, each door panel track 104 includes height adjustment slots 162 so that the height of each door panel track 104 with respect to interior side 130 of door panel 102 when door panel 102 is in the open position can be adjusted as needed to align with respective bridge piece 164 and with respective interior tracks 128. Door system 100 includes extension pieces 166 selectively engageable with respective door panel tracks 104 when door panel 102 is in the open position to extend door panel track 104 beyond the periphery of door panel 102 on a top side of door panel 102 of door panel 102 to facilitate movement of a cart 168 beyond the periphery of door panel 102. Bridge pieces 164 and extension pieces 166 also include height adjustment slots 162. It is also contemplated that door panel track 104 includes lateral adjustment slots 184, shown in more detail in FIG. 11, to adjust the position of door panel track 104 in a direction parallel to hinge axis A of door panel 102.

Figure 10:
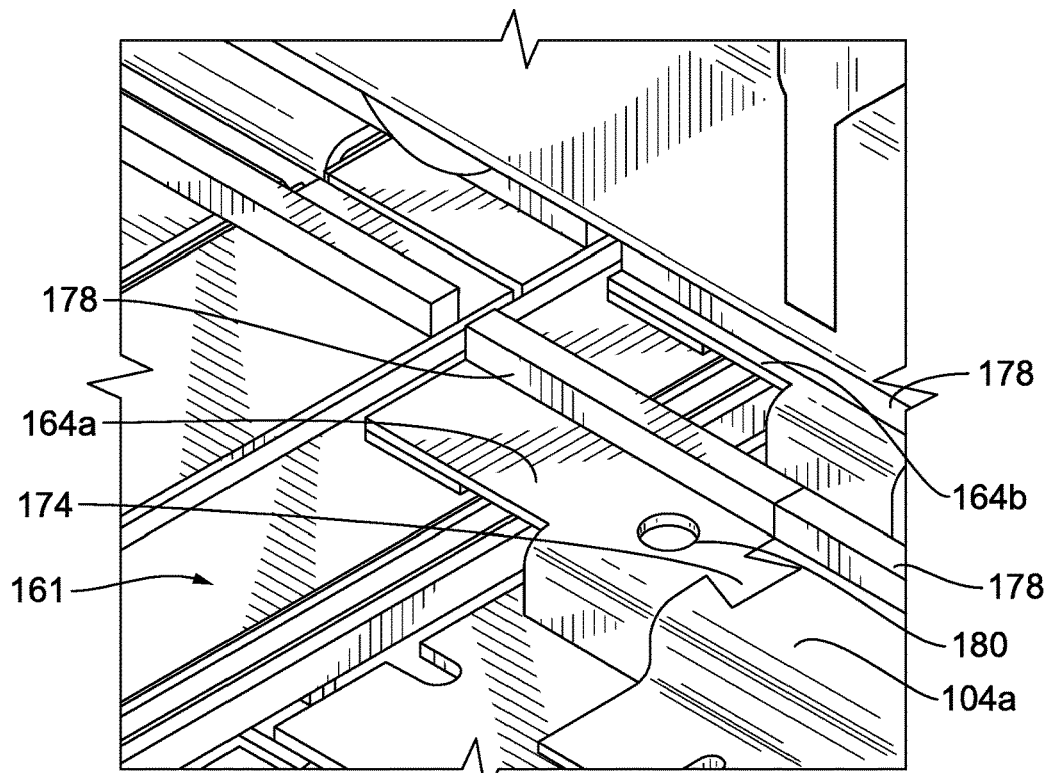
FIG. 10 is a perspective view of a portion of the SCR door system of FIG. 1, showing the dovetail connection between one of the bridge pieces of FIG. 8 and the door panel track.
Figure 11:
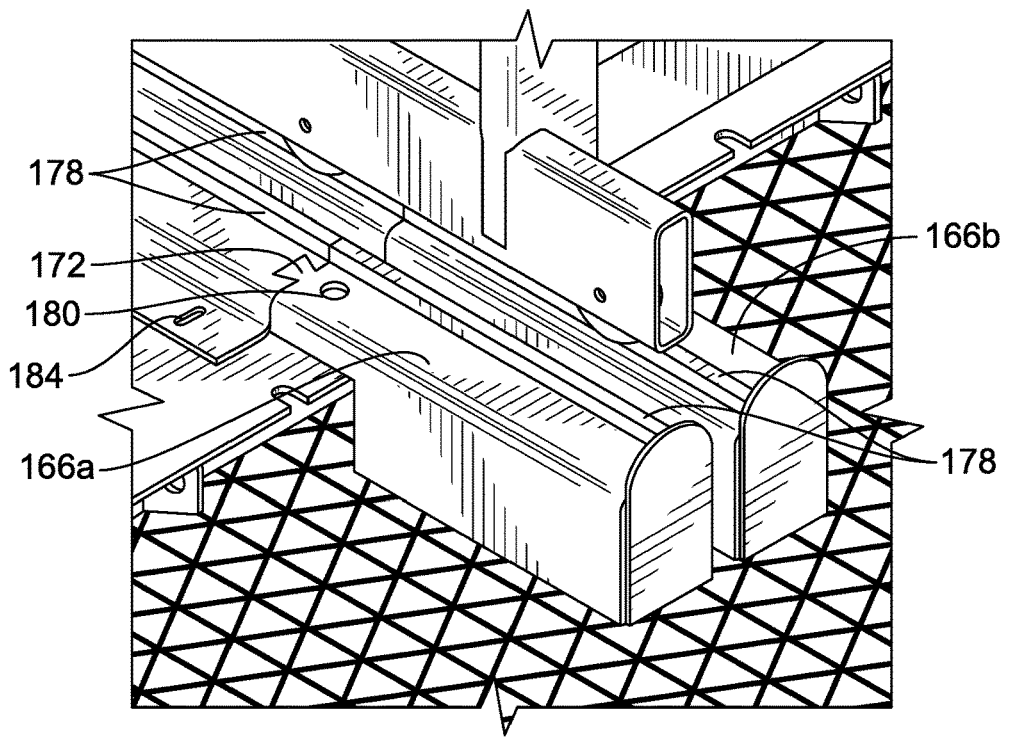
FIG. 11 is a perspective view of a portion of the SCR door system of FIG. 1, showing the dovetail connection between one of the extension pieces of FIG. 9 and the door panel track.

As shown in FIGS. 8A-8B, 10 and 11, extension pieces 166 are engaged with respective door panel tracks 104 using a dovetail joint 172. Bridge pieces 164 also include a dovetail joint 174. This facilitates easier in-field alignment between bridge and extension pieces, 164 and 166, respectively, and their respective door panel tracks 104. At the abutment of two adjacent door panels, for example, door panels 102a and 102b, track 104 includes two track halves 104a and 104b. Each track half 104a and 104 includes a respective rail 178. For tracks 104 in the middle of their respective door panel 102, each track 104 is a single unit with two rails 178. This is similar for extension pieces 166 and bridge pieces 164. Extension pieces 166 for the half-tracks 104a and 104b include half extension pieces 166a and 166b, as shown in FIG. 11. Bridge pieces 164 for the half-tracks 104a and 104b include half extension pieces 164a and 164b, as shown in FIG. 10. Bridge pieces 164 and extension pieces 166 can also include apertures to facilitate hanging on outer side 182 (shown in FIG. 4) of door panel 102 when not in use.

The methods and systems of the present disclosure, as described above and shown in the drawings, provide for SCR door systems with superior properties including reduced down time, ease of use and reduced costs. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A door system configured for use with a selective catalytic reactor having a doorway to a chamber, the door system comprising:
 a door panel that selectively moves between a closed position for sealing the doorway of the chamber and an open position for permitting access to an interior of the chamber through the doorway, wherein the door panel has an inner side generally facing the interior of the chamber when the door panel is in the closed position;

a door panel track connected to the inner side of the door panel that selectively cooperates with an interior track of the chamber to facilitate movement of a cart between the door panel to the interior of the chamber;

an extension piece selectively engageable with the door panel track when the door panel is in the open position to extend the door panel track beyond a periphery of the door panel on a top side of the door panel opposite from a hinge axis of the door panel to facilitate movement of the cart beyond the periphery of the door panel; and a bridge piece selectively engageable with the door panel track when the door panel is in the open position to connect the door panel track on a hinge side of the door panel with an interior track of the chamber to facilitate movement of the cart across a threshold between the door panel to the interior of the chamber.

2. The door system as recited in claim 1, wherein the door panel pivots about the hinge axis on the hinge side between the open position and the closed position.

3. The door system as recited in claim 2, further comprising a hinge assembly on the hinge side of the door panel, wherein the hinge assembly includes a hinge lug and a pin.

4. The door system as recited in claim 3, wherein the hinge lug is operatively connected to the door panel and includes an aperture for receiving the pin.

5. The door system as recited in claim 4, wherein the aperture is sized to provide a predetermined amount of play between the pin and the aperture such that the door panel is free to move for adjusting to generally uniformly contact and compress a gasket upon the door panel being moved to the closed position.

6. The door system as recited in claim 1, wherein the door panel includes spaced apart slots around the periphery to accommodate swing bolts securing the door panel in the closed position.

7. The door system as recited in claim 1, wherein the door panel track is a first door panel track and wherein the door system includes a second door panel track connected to the inner side of the door panel.

8. The door system as recited in claim 1, wherein the door panel track includes height adjustment slots to adjust the height of the door panel track with respect to the interior side of the door panel when the door panel is in the open position.

9. The door system as recited in claim 1, wherein the door panel track includes lateral adjustment slots to adjust the position of the door panel track in a direction parallel to a hinge axis of the door panel.

10. The door system as recited in claim 1, further comprising a door frame for surrounding the doorway, wherein the door frame is selectively engaged with the door panel when the door panel is in the closed position.

11. The door system as recited in claim 10, wherein the door frame includes swing bolts around a periphery of the door frame to selectively engage with the door panel when the door panel is in the closed position.

12. The door system as recited in claim 10, wherein the door frame includes rectangular tubing, and wherein the swing bolts are mounted to the rectangular tubing.

13. The door system as recited in claim 1, wherein the door panel is a first door panel and the door system includes a second door panel adjacent to the first door panel, wherein the first and second door panels form a gap therebetween.

14. The door system as recited in claim 13, further comprising a splice plate releasably attached to the first and second door panels to selectively cover the gap in a sealed position.

15. The door system as recited in claim 14, wherein the splice plate defines a longitudinal axis and includes spaced apart slots having respective openings that face away from the longitudinal axis to accommodate swing bolts in the sealed position.

16. The door system as recited in claim 1, further comprising an opening and closing rod assembly operatively connected to the top side of the door panel.

17. The door system as recited in claim 16, wherein the opening and closing rod assembly includes a removable threaded rod and a keeper lug to hold the removable threaded rod.

18. The door system as recited in claim 17, wherein the keeper lug includes a rotatable block through which the removable threaded rod extends.

19. The door system as recited in claim 1, wherein the door panel track includes a rail and the extension piece includes an extension rail, wherein the extension rail extends beyond the periphery of the door panel on the top side of the door panel and cooperates with the rail of the door panel to facilitate movement of the cart beyond the periphery of the door panel.

* * * * *